United States Patent [19] [11] Patent Number: 4,628,442
Isobe et al. [45] Date of Patent: Dec. 9, 1986

[54] CENTRALIZED PERIPHERAL INTERFACE WITH A NUMERICAL CONTROL UNIT

[75] Inventors: Shinichi Isobe; Kazuo Sawada, both of Hino, Japan

[73] Assignee: Fanuc Ltd, Minamitsuru, Japan

[21] Appl. No.: 808,665

[22] PCT Filed: Sep. 22, 1982

[86] PCT No.: PCT/JP82/00379
§ 371 Date: May 18, 1983
§ 102(e) Date: May 18, 1983

[87] PCT Pub. No.: WO83/01129
PCT Pub. Date: Mar. 31, 1983

Related U.S. Application Data

[63] Continuation of Ser. No. 499,163, May 18, 1983, abandoned.

[30] Foreign Application Priority Data

Sep. 22, 1981 [JP] Japan .................. 56-149819

[51] Int. Cl.⁴ .................. G05B 19/18; G06F 15/00
[52] U.S. Cl. .................. 364/167; 364/136; 364/200; 364/900
[58] Field of Search .............. 364/167, 136, 140, 141, 364/474, 200, 900

[56] References Cited

U.S. PATENT DOCUMENTS

| 3,571,802 | 3/1971 | Serra | 364/200 |
| 3,673,576 | 6/1972 | Donaldson, Jr. | 364/200 |
| 3,970,997 | 7/1976 | Daly et al. | 364/200 |
| 4,025,906 | 5/1977 | Riikonen | 364/200 |
| 4,034,354 | 7/1977 | Simmons | 364/900 |
| 4,038,533 | 7/1977 | Dummermuth | 364/136 |
| 4,047,159 | 9/1977 | Boudry | 364/200 |
| 4,052,702 | 10/1977 | Smith et al. | 364/200 |
| 4,075,691 | 2/1978 | Davis et al. | 364/200 |
| 4,079,452 | 3/1978 | Larson et al. | 364/200 |
| 4,092,714 | 5/1978 | Norton et al. | 364/200 |
| 4,200,936 | 4/1980 | Borzak et al. | 364/900 |
| 4,298,958 | 11/1981 | Takaki et al. | 364/900 |
| 4,314,329 | 2/1982 | Crewe et al. | 364/141 |
| 4,368,511 | 1/1983 | Imazeki | 364/167 |
| 4,396,973 | 8/1983 | Imazeki et al. | 364/136 |

FOREIGN PATENT DOCUMENTS

| 2839736 | 4/1979 | Fed. Rep. of Germany . |
| 2375646 | 7/1978 | France . |
| 55-39931 | 3/1980 | Japan . |
| 1359073 | 7/1974 | United Kingdom . |

Primary Examiner—Jerry Smith
Assistant Examiner—John R. Lastova
Attorney, Agent, or Firm—Staas & Halsey

[57] ABSTRACT

A numerical control apparatus having a numerical control unit (11), a data input/output circuit for sending and receiving data between a machine (19) and the numerical control unit, a data input unit (13) for entering NC data, a manual data input unit (16) for entering NC data manually, and an operator's pendant (17), wherein there is provided a local control circuit (101), separate from the numerical control unit, for centrally controlling the data input unit, the manual data input unit and the operator's pendant. The local control circuit is connected to the numerical control unit directly through a data transfer line, or through the data input-/output circuit.

6 Claims, 4 Drawing Figures

CENTRALIZED PERIPHERAL INTERFACE WITH A NUMERICAL CONTROL UNIT

This is a continuation of co-pending application Ser. No. 499,163 filed on May 18, 1983 and now abandoned.

DESCRIPTION

1. Technical Field

This invention relates to a numerical control apparatus and, more particularly, to a numerical control apparatus well-suited for application to a numerical control system in which a numerical control apparatus and a machine tool are united into a mechanical-electronics arrangement.

2. Background Art

A computerized numerical control apparatus includes a numerical control unit comprising a microprocessor or the like and is connected to various input/output units by a data bus. FIG. 1 is a block diagram of such a numerical control apparatus. In the drawing, numeral 11 denotes a numerical control unit including a read/write data memory (RAM) 11a for storing machining program data and the results of processing, a read-only memory (ROM) 11b for storing a control program which controls all numerical control processing, a processor 11c for executing various kinds of processing such as processing for sensing and receiving signals, a pulse distributor 11d which receives a position command as an input and produces distributed pulses by performing known pulse distribution computations, and a servo circuit 11e for controlling the rotation of a motor. Numeral 12 designates a bus line having an address bus for transferring address signals and a data bus for transferring data. Numeral 13 denotes a paper tape reader for reading machining program data punched in a paper tape that is to be stored in the data memory 11a. Numeral 14 denotes a paper tape puncher for recording the machining program data by punching the data, stored in the data memory 11a, into a paper tape serving as an external storage medium. It should be noted that a magnetic cassette tape device and magnetic bubble cassete device may be connected to the unit in place of the date reader 13 and tape puncher 14. Numeral 15 designates a power magnetics circuit (data input/output circuit) for sending and receiving data between a machine tool and the numerical control unit. Specifically, the power magnetics circuit 15 delivers signals indicative of M-, S- and T-function instructions and the like from the numerical control unit 11 to a machine 19. This circuit also supplies the numerical control unit with various limit switch signals, relay contact signals and operation completion signals concerning the M-, S- and T-function instructions that are received from the machine 19. Numeral 16 represents a manual data input unit (MDI unit) equipped with a CRT. The MDI unit 16 allows manual entry of single blocks of machining data, and also permits correcting a machining program, partial deletion of and addition to the machining program, and other functions. Numeral 17 designates an operator's pendant provided with various switches and buttons such as a cycle start button, a mode selection switch, a jog feed button and a zero-point return button. Numeral 18 is a manual pulse generator for generating pulses in response to a manual operation. As shown in FIG. 2, an arrangement is also possible wherein the MDI unit 16 and operator's pendant 17 are connected to the bus line 12 through the power magnetics circuit (data input/output circuit) 15.

The numerical control unit 11 controls the machine tool by executing numerical control processing under the control of the control program on the basis of the machining program data stored in the data memory 11a. Simultaneously with the numerical control processing, the numerical control unit 11 monitors the status of the machine tool (such as the on/off state of various limit switches) received via the power magnetics circuit; monitors the state of the switches and buttons on the operator's pendant; and performs processing in accordance with the status of the machine tool and the states established by the operator's pendant. The reading of, e.g., data and operating states from the various devices 13 through 18 connected to the bus line 12, or the outputting of data to each of these devices is initiated by an interrupt or by applying address signals to an address bus to successively identify the devices and to read the data from or place the data on the data bus.

Recent systems use a so-called mechanical-electronics construction wherein a numerical control apparatus and machine are unified. In such a mechanical-electronics system, the numerical control unit 11 is located at the back of the machine tool 19 while the data input/output units such as the tape reader 13 and tape puncher 14, as well as the operator-manipulated devices such as the MDI unit 16, operator's pendant 17 and manual pulse generator 18, are located at an easily accessible location remote from the numerical control unit 11. Accordingly, if the arrangement of FIG. 1 or FIG. 2 is employed without making any change in the numerical control apparatus of the mechanical-electronics system, the various devices must be connected to the numerical control unit 11 by connecting cables of considerable length. This complicates the system, and results in higher cost and in misconnections.

SUMMARY OF THE INVENTION

Accordingly, an object of the present invention is to provide a numerical control apparatus wherein connecting cables can be reduced even in a mechanical-electronics system, and wherein it is possible to achieve remote control with excellent operability and to lighten the processing burden of the numerical control unit.

To achieve this and other objects, the present invention includes a numerical control apparatus comprising a numerical control unit; a data input/output circuit for sending and receiving data between a machine and the numerical control unit; a data input unit such as a tape reader for entering NC data; a manual data input unit for manually entering NC data; and an operator's pendant, wherein there is provided a local control circuit, separate from the numerical control unit, for centrally controlling the data input unit, the manual data input unit and the operator's pendant, etc. The local control circuit is connected to the numerical control unit directly through a data transfer line, or through the data input/output circuit.

With the numerical control apparatus of the present invention, connecting cables can be markedly reduced in a mechanical-electronics system even when the numerical control unit is remote from each of the operator-manipulated devices. This simplifies the system arrangement and prevents the occurrence of misconnections. Further, since each of the operator-manipulated devices is controlled by the local control circuit, the numerical control unit need only exchange data with a power magnetics circuit or with the power magnetics circuit and the local control circuit, thereby lightening the processing burden of the numerical control unit. Since the operator-manipulated devices are collected together at a single location in accordance with the present invention, the operator can perform his tasks with greater efficiency and remote control can be performed with facility.

BRIEF DESCRIPTION OF THE PREFERRED EMBODIMENT

An embodiment of the present invention is described with reference to the drawings.

Figure 1:
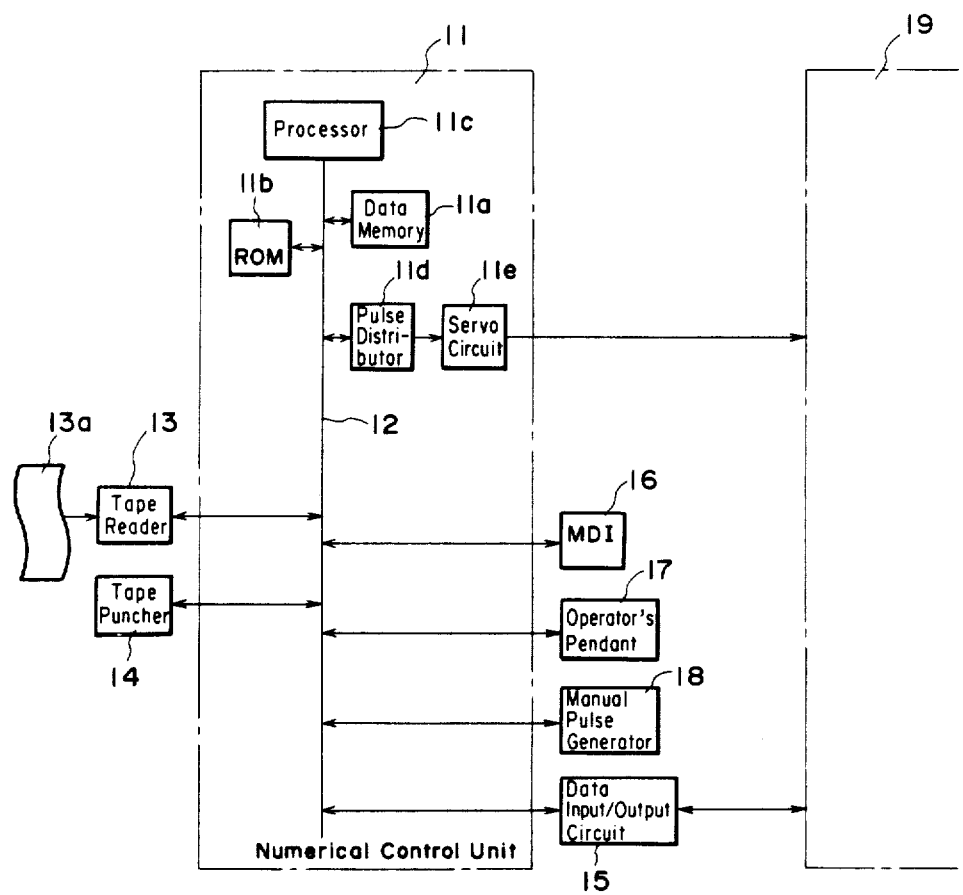
FIGS. 1 and 2 illustrate arrangements of a conventional numerical control apparatus.
Figure 2:
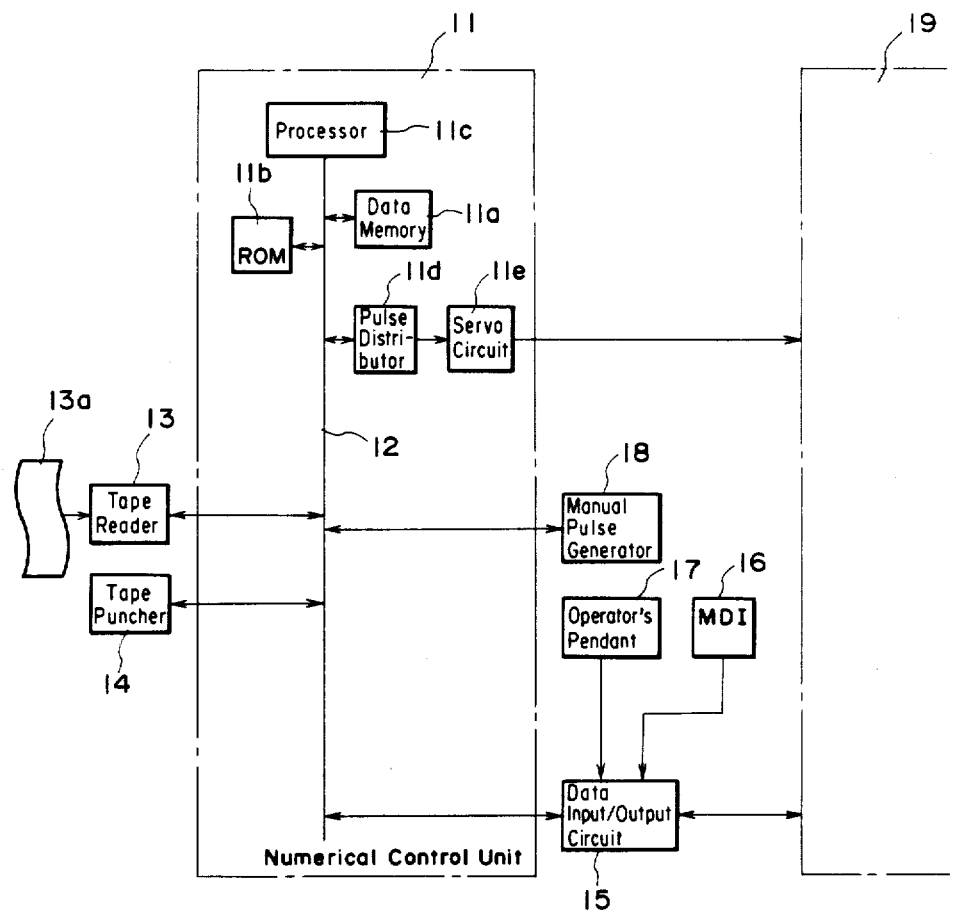
Figure 3:
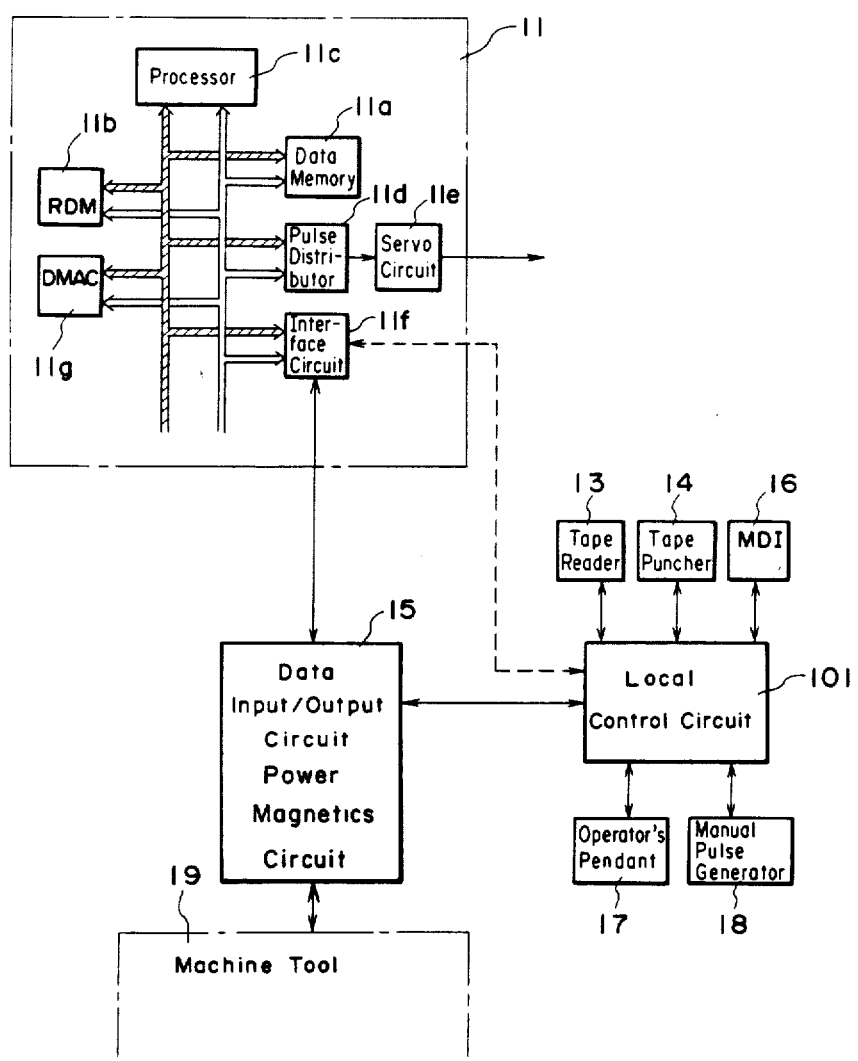
FIG. 3 shows an arrangement of a numerical control apparatus according to the present invention.

FIG. 3 is a block diagram illustrating one embodiment of the present invention. Portions similar to those shown in FIG. 1 are designated by like reference characters. In FIG. 3, numeral 101 denotes a local control circuit connected to the tape reader 13, the tape puncher 14, the MDI unit 16 including a CRT, the operator's pendant 17 and the manual pulse generator 18. The control circuit 101 is connected to the numerical control unit 11 through the power magnetics circuit 15, or directly to an interface circuit 11f of the numerical control unit 11 without the intermediary of the power magnetics circuit 15, as indicated by the dashed line. Numeral 11g denotes a direct memory access controllor (referred to as a DMAC).

Figure 4:
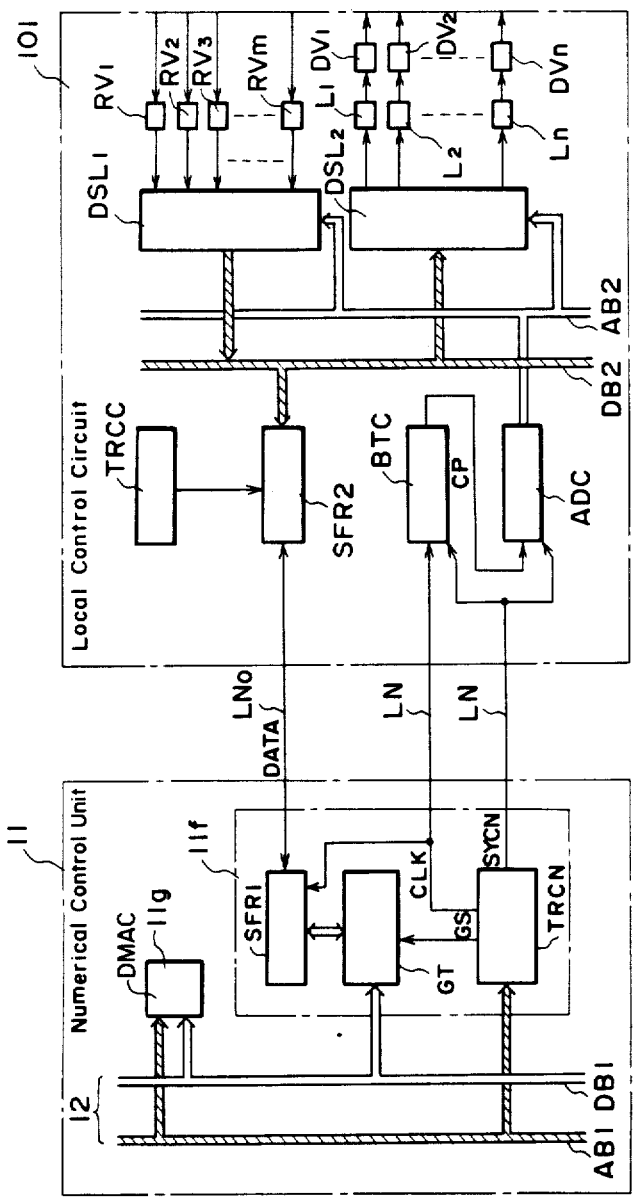
FIG. 4 is a block diagram of an essential portion of the arrangement of FIG. 3.

FIG. 4 is a block diagram showing an essential portion of FIG. 3. This illustrates the case where the numerical control unit 11 and local control circuit 101 are interconnected directly without using the power magnetics circuit 15.

In the interface circuit 11f, SFR1 represents a shift register capable of both parallel and serial writing and reading. GT denotes a gate circuit for controlling the writing of data into the shift register SFR1 and the reading of data out of SFR1. TRCN represents a transmission control circuit for generating block pulses CLK and a synchronizing signal SYNC when a serial data transfer takes place. The transmission control circuit TRCN receives an address signal from the address bus AB1 and responds by generating a gate signal GS for controlling the status of the gate circuit GT.

In the local control circuit 101, TRCC represents a transmission control circuit, and SFR2 denotes a shift register capable of both parallel and serial writing and reading of data, similar to the shift register SFR1. BTC denotes a bit counter having a capacity equivalent to the number of bits (e.g., eight) in one item of parallel data. The bit counter BTC counts the clock pulses CLK received from the numerical control unit 11 and generates a single carry pulse CP when eight clock pulses CLK have arrived, namely in response to transmission of eight bits of data. ADC represents an address counter for generating an address signal. The address counter ADC counts the carry pulses CP and transmits the counted value as an address signal on an address bus AB2. RV1 through RVm denote receivers and DV1 through DVn represent drivers, these being connected to the tape reader 13, tape puncher 14, MDI unit 16, operator's pendant 17 and manual pulse generator 18. L1 through Ln designate latch circuits, and DSL1, DSL2 represent data selectors for reading data and for transmitting data, respectively. The data selector DSL1 reads data from eight of the receivers in accordance with an address received from the address counter ADC via the address bus AB2, and delivers the data to a data bus DB2. For example, let receivers RV1 through RV8 correspond to an i-th address and let receivers RV9 through RV16 correspond to an (i+1)-th address. Then, when an address i is transmitted on the address bus AB2, data received by RV1 through RV8 is delivered to the data bus DB2. When an address (i+1) is transmitted on the address bus AB2, data received by RV9 through RV16 is delivered to the data bus DB2. This operation proceeds in the manner described to read the data. The data selector DSL2 stores the data on the data bus DB2 in eight of the latch circuits in accordance with an address received on the address bus AB2 from the address counter ADC. For example, let latch circuits R1 through L8 correspond to a j-th address and let latch circuits L9 through L16 correspond to a (j+1)-th address. Then, when an address j is transmitted on the address bus AB2, the data on the data bus DB2 is stored in the latch circuits L1 through L8. When an address (j+i) is transmitted on the address bus AB2, the data on the data bus DB2 is stored in the latch circuits L9 through L16.

The following describes a sequence of data transfers to first, second and subsequent addresses. The data being sent from the numerical control unit 11; latch circuits L1 through L8 correspond to the first address, latch circuits L9 through L16 correspond to the second address, and so on.

First, prior to a direct memory access operation, which is performed by the direct memory access controller 11g, the transmission control circuit TRCN of the numerical control unit 11 generates the synchronizing signal SYNC which is transmitted to the local control circuit 101 through a cable LN2. The synchronizing signal SYNC is applied to the address counter ADC and to the bit counter BTC to clear the contents thereof. Thereafter, the direct memory access controller 11g responds to a command from the processor 11c by starting a direct memory access operation to transfer data. When a transfer command for reading N-bytes of data from a prescribed address of the data memory 11a (FIG. 3) and for transferring the data is received from the processor 11c, the direct memory access controller 11g utilizes the idle time of the bus line to access the data memory 11a directly and to read the stored contents out of the memory beginning at the prescribed address byte by byte in cyclic fashion and for applying the same to the interface circuit 11f. Further, when a write command for writing N-byte data successively into the data memory 11a from a prescribed address thereof is received from the processor, the direct memory access controller 11g uses the idle time of the bus line to read the data from the interface circuit 11f and to access the data memory 11a directly for successively writing in the data beginning at the prescribed address.

Thus, via the direct memory access operation the data stored in the data memory 11a is read successively and written into the shift register SFR1 in parallel fashion through the gate circuit GT.

Next, data is delivered to a data cable LNo while being shifted bit by bit in response to the clock pulses CLK. In other words, parallel data is converted into serial data, DATA. At this time, the clock pulses CLK also are delivered through a cable LN1 to indicate each bit position of the serial data DATA. Meanwhile, the local control circuit 101 samples the serial data DATA transmitted in response to the clock pulses CLK and performs a serial-parallel conversion (SP conversion) by writing the data into the shift register SFR2 in serial fashion while the data is shifted sequentially bit by bit. At the same time, the clock pulses CLK enter and are counted by the bit counter BTC. The bit counter BTC generates a carry pulse CP to increment the address counter when eight clock pulses are counted; this being equivalent to the length (eight bits) of the serial data transmitted. The SP conversion of the serial data is ended by the incrementing of the address counter ADC. The data is written in parallel fashion from the shift register SFR2, through the data bus DB2 and into the latches L1 through L8, which correspond to the first data address i.e., the contents of the address counter ADC being 1, and are then delivered to the various operator-manipulated devices through the corresponding drivers DV1 through DV8.

Thereafter, and in similar fashion, the contents of the address counter ADC is successively incremented so that the address counter generates a first address signal and a second address signal to select the corresponding latch circuits. In FIG. 4, the address signals are generated within the local control circuit 101. It is permissible, however, to transmit the address signals from the numerical control unit 11 via the cable LNo. In such case the cables LN1 and LN2 can be deleted.

In the foregoing, command data is successively transmitted from the numerical control unit 11 to each of the operator-manipulated devices, namely to the tape reader 13, tape puncher 14, MDI unit 16, operator's pendant 17 and manual pulse generator 18.

On the other hand, data is also received by the interface circuit 11f from each of the operator-manipulated devices, through the receivers RV1 through RVm, data selector DSL1, data bus DB2 and shift register SFR2. This data is subsequently stored in the data memory 11a via the direct memory access controller 11g.

In accordance with the present invention, the numbers of connecting cables can be markedly reduced in a mechanical-electronics system even when the numerical control unit is remote from each of the operator-manipulated devices. This simplifies the system and prevents the occurrence of misconnections. Further, since each of the operator-manipulated devices is controlled by the local control circuit, the numerical control unit need only exchange data with the power magnetics circuit or with the power magnetics circuit and local control circuit, thereby lightening the processing burden of the numerical control unit. Since the operator-manipulated devices are collected together at a single location in accordance with the present invention, the operator can perform his tasks with greater efficiency and remote control can be performed with facility.

What is claimed is:

1. A numerical control apparatus for controlling a machine, comprising:
   a numerical control unit;
   a data input unit for entering NC data into said numerical control unit;
   a manual data input unit for manually entering NC data into said numerical control unit;
   an operator's pendant for entering data into said numerical control unit;
   a local control circuit for controlling the transfer of data between said data input unit and said numerical control unit, said manual data input unit and said numerical control unit, and said operator's pendant and said numerical control unit, said local control circuit including:
   receiver means, respectively connected to said data input, said manual input and said operator's pendant, for receiving NC data from said data input, said manual input and said operator's pendant;
   driver means, respectively connected to said data input and said operator's pendant, for providing output NC data to said data input and said operator's pendant;
   first data selector means, operatively connected to said receiver means, for selectively providing said received NC data in response to control signals;
   second data selector means, operatively connected to said driver means, for providing said output NC data to said driver means in response to said control signals;
   shift register means for receiving in parallel said received NC data from said first data selector means, for providing in parallel said received NC data to said second data selector means, for serially receiving over a single data line said output NC data for said second data selector means, and for serially providing over said single data line said received NC data from said first data selector means, such that said numerical control unit selectively exchanges NC data with said data input unit, said manual input and said operator's pendant over said single data line.

2. A numerical control apparatus according to claim 1, further comprising:
   a data input/output circuit, operatively connectable between said numerical control unit and the machine and connected between said numerical control unit and said local control circuit, for controlling data transfers between the machine and the numerical control unit, controlling data transfers between said numerical control unit and said local control circuit, such that said data passes over a single data line and through said data input/output circuit.

3. A numerical control apparatus according to claim 1, wherein said local control circuit is directly connected to the numerical control unit by said single data line.

4. A numerical control apparatus according to claim 1, claim 2 or claim 3, wherein said data input unit, said manual data input unit and said operator's pendant are connected to the local control circuit via a single data line.

5. A numerical control apparatus for controlling a machine, said apparatus comprising:
   numerical control means, operatively connectable to the machine, for receiving numerical control (NC) data and for controlling machine operations in accordance with said numerical control data;
   a plurality of numerical control input/output means for generating and receiving said numerical control data; and
   local control means, operatively connected between said numerical control means and each of said plurality of numerical control input/output means, for serially transferring said numerical control data to and from said numerical control means over a single data line so that said numerical control means selectively communicates with said plurality of numerical control input/output means over said single data line, said local control means including:

receiver means, respectively connected to said plurality of numerical control input/output means, for receiving NC data from said plurality of numerical control input/output means;

driver means, respectively connected to selected ones of said plurality of numerical control input/output means, for providing output NC data to said selected ones of said plurality of numerical control input/output means;

first data selector means, operatively connected to said receiver means, for selectively providing said received NC data in response to control signals;

second data selector means, operatively connected to said driver means, for providing said output NC data to said driver means in response to said control signals;

shift register means for receiving in parallel said received NC data from said first data selector means, and for providing in parallel said received NC data to said second data selector means, for serially receiving over a single data line said output NC data for said second data selector means, and for serially providing over said single data line said received NC data from said first data selector means.

6. A numerical control apparatus according to claim 5, wherein said local control means is remote from said numerical control means and provides said numerical control data directly to and communicates directly with said numerical control means.

* * * * *